US012734527B2

(12) United States Patent
Krauss et al.

(10) Patent No.: US 12,734,527 B2
(45) **Date of Patent: *Sep. 15, 2026**

(54) CRUSHER FOR MINERAL MATERIALS OR RECYCLED MATERIALS

(71) Applicant: Kleemann GmbH, Göppingen (DE)

(72) Inventors: Till Krauss, Rechberghausen (DE); Gerd Meyer, Amstetten (DE); Jochen Meier, Hülben (DE); Steffen Haberle, Herbrechtingen (DE); Rainer Teichert, Haan (DE)

(73) Assignee: Kleemann GmbH, Göppingen (DE)

( * ) Notice: Subject to any disclaimer, the term of this patent is extended or adjusted under 35 U.S.C. 154(b) by 274 days.

This patent is subject to a terminal disclaimer.

(21) Appl. No.: 18/736,685

(22) Filed: Jun. 7, 2024

(65) Prior Publication Data

US 2025/0001427 A1 Jan. 2, 2025

(30) Foreign Application Priority Data

Jun. 28, 2023 (DE) ..................... 10 2023 116 992.0

(51) Int. Cl.

*B02C 1/02* (2006.01)
*B02C 4/32* (2006.01)
*B02C 4/34* (2006.01)
*F16K 17/04* (2006.01)
*F16K 17/08* (2006.01)

(52) U.S. Cl.

CPC .................. *B02C 1/02* (2013.01); *B02C 4/32* (2013.01); *B02C 4/34* (2013.01); *F16K 17/0446* (2013.01); *F16K 17/082* (2013.01); *B02C 1/025* (2013.01)

(58) Field of Classification Search

CPC ......... B02C 13/02; B02C 13/06; B02C 13/09; B02C 1/02; B02C 1/025; B02C 4/32; B02C 4/34; F16K 17/0446; F16K 17/082

See application file for complete search history.

(56) References Cited

U.S. PATENT DOCUMENTS 8,844,851 B2 9/2014 Solomon
10,279,354 B2 5/2019 Young et al.
(Continued)

FOREIGN PATENT DOCUMENTS

CN 107762994 A * 3/2018 ............. F02M 21/02
DE 4436742 A1 5/1995
(Continued)

OTHER PUBLICATIONS

Translation of CN-107762994.*
(Continued)

*Primary Examiner* — Bobby Yeonjin Kim
(74) *Attorney, Agent, or Firm* — Lucian Wayne Beavers; Patterson Intellectual Property Law, PC

(57) ABSTRACT

A crusher includes first and second crusher bodies defining a crushing gap. A hydraulic cylinder is coupled to one of the crusher bodies to adjust a width of the crushing gap. A pressure relief valve includes a pressure chamber communicated with the hydraulic cylinder. A pressure relief piston is movable between a closed position and an open position. The closed position blocks a fluid connection between the pressure chamber and a pressure equalization area exterior of the pressure relief valve. The pressure relief piston includes at least one piston pressure surface delimiting the pressure chamber in the closed position transversely to the actuating direction of the piston, wherein in the closed position of the pressure relief piston a projection of the at least one piston pressure surface in a projection plane transverse to the actuating direction of the pressure relief piston delimits only a part of the pressure chamber transverse to the actuating direction of the pressure relief piston.

15 Claims, 4 Drawing Sheets

(56) References Cited

U.S. PATENT DOCUMENTS

| | | | | |
|---|---|---|---|---|
| 10,478,823 | B2 | 11/2019 | Sjoberg | |
| 10,596,576 | B2 | 3/2020 | Rust et al. | |
| 10,751,724 | B2 | 8/2020 | Dallimore et al. | |
| 11,779,932 | B2 | 10/2023 | Meyer et al. | |
| 2015/0224508 | A1 | 8/2015 | Jonkka | |
| 2018/0071742 | A1 | 3/2018 | Grimm et al. | |
| 2021/0039107 | A1 | 2/2021 | Meyer et al. | |
| 2021/0370308 | A1* | 12/2021 | Meyer | B02C 1/005 |

FOREIGN PATENT DOCUMENTS

| | | | | |
|---|---|---|---|---|
| DE | 10015785 | A1 | 10/2001 | |
| DE | 102017002079 | B4 | 3/2019 | |
| EP | 19541 | B1 | 11/1982 | |
| EP | 2774681 | A1 * | 9/2014 | B02C 2/04 |
| EP | 2774681 | B1 | 5/2016 | |
| EP | 3919177 | B1 | 1/2023 | |

OTHER PUBLICATIONS

Translation of EP-2774681.*

U.S. Office Action for corresponding U.S. Appl. No. 18/736,689, dated Apr. 8, 2026, 16 pages.

German Office Action for corresponding Patent Application No. 10 2023 116 992.0, dated Feb. 26, 2024, 12 pages.

European Patent Office Search Report for corresponding patent application No. 24180368.3, dated Aug. 8, 2024, 10 pages.

* cited by examiner

CRUSHER FOR MINERAL MATERIALS OR RECYCLED MATERIALS

CROSS-REFERENCE TO RELATED APPLICATION

The present application claims priority to German Patent Application Ser. No. 10 2023 116 992.0 filed Jun. 28, 2023, which is incorporated herein by reference.

BACKGROUND OF THE DISCLOSURE

Field of the Disclosure

The disclosure relates to a crusher for mineral materials or recycling materials, in particular a rotary impact crusher, jaw crusher, cone crusher or roll crusher, having a crusher unit, which comprises a first crusher body, in particular a rotor or a crushing jaw, wherein the first crusher body is assigned to a second movable crusher body, in particular an impact rocker or a crushing jaw, wherein a crushing gap is formed between the crusher bodies, wherein a hydraulic cylinder is coupled to one of the crusher bodies, which hydraulic cylinder is disposed and designed to permit a motion of the coupled crusher body, which motion increases the width of the crushing gap in an evasive motion, wherein a pressure space of the hydraulic cylinder is connected to a pressure chamber of a pressure relief valve of an overload triggering device, wherein a piston of the pressure relief valve can be moved between a closed position and an open position in a cylinder, wherein a fluid-conveying connection between the pressure chamber and a pressure equalization area is blocked in the closed position and in the open position the fluid-conveying connection is at least sectionally open, and wherein the piston comprises at least one piston pressure surface by means of which the piston delimits the pressure chamber in the closed position transversely to the actuating direction of the piston.

Description of the Prior Art

From DE 10 2017 002 079 B4 an impact crusher is known, in which a variable crushing gap is adjusted between a rotatable rotor and an impact rocker. In normal crushing operation, a material feeder is used to feed the material to be crushed to the rotor. The rotor flings the material against the impact rocker. The resulting forces cause the rock material to be crushed. The rock material is thus broken to the desired particle size and can fall out of the crusher housing through the crushing gap. It may however happen that non-crushable bodies are fed into the rotor. For instance, iron parts. This is a critical overload situation for the impact crusher. In particular, there is a risk of damage to the crusher in the process. To render such an overload situation controllable, a piston-cylinder unit is coupled to the impact rocker. It can be used to alter the position of the impact rocker and thus the width of the crushing gap. The piston-cylinder unit includes a gas spring against which the impact rocker rests.

In normal crushing operation, the width of the crushing gap is set to the desired dimension. In the event of a critical overload, the gas spring can be compressed, causing the impact rocker to move out of the way. In this way, the crushing gap can be enlarged in a pulse-like manner. The non-crushable body can then fall through the crushing gap. Subsequently, the width of the crushing gap is re-adjusted to the desired dimension.

The gas spring proposed in DE 10 2017 002 079 B4 introduces elasticity into the support of the impact rocker. During crushing, the forces will vary in a certain permissible degree due to different hardnesses and different sizes of the rocks. In response to these changing forces, the elastic gas spring causes a constant variation of the crushing gap and thus of the grain size of the crushed material, which is undesirable.

From EP 0 019 541 B1 an impact mill is known, in which the crushing gap can be adjusted via a hydraulic cylinder. The hydraulic cylinder has a piston, to which a piston rod is coupled. The piston can be moved in a cylinder space. The piston rod is connected to the impact rocker. An overload valve is provided in case of an overload situation. If a non-crushable body enters the crushing chamber, the overload valve is triggered. It increases the size of the crushing gap and the non-crushable body can fall out of the crushing chamber.

In crushers, in particular in rotary impact crushers, as has already been indicated above, rock material of different size and different hardness is frequently fed into the crusher unit during normal crushing operation. The rotary impact crusher can deal with these rock materials and crush them. In this respect, such an uncritical case has to be distinguished from a critical overload situation, in which a non-crushable body enters the sphere of the crusher unit. The process known from EP 0 019 541 B1 is suitable for slow-running crusher variants. The machine components for setting the crushing gap and the piston rod of the hydraulic cylinder have to be moved to such an extent that the fluid compression creates a chamber pressure that triggers the pressure relief valve. It is obvious that the setting pressure of the pressure relief valve may not be too low, as otherwise normal crusher loads would cause the crushing gap to become misaligned, which would result in a significant reduction in the quality of the end material. Fast-running crusher variants require the crushing gap to open quickly. Accordingly, the pressure relief valve has to be able to react quickly and at the same time be sufficiently dimensioned to limit the pressure increase caused by the rapidly accelerating machine components for setting the crushing gap.

Further crushers having overload triggering devices are known from EP 3 919 177 B1 (U.S. Pat. No. 11,779,932) and EP 2 774 681 B1 (U.S. Pat. No. 10,478,823).

SUMMARY OF THE DISCLOSURE

The disclosure addresses the problem of providing a crusher of the type mentioned above, in which the overload triggering device responds quickly in the event of an overload, and at the same time the crushing gap is kept as constant as possible during normal operation.

This problem is solved in that in the closed state of the pressure relief valve, the projection of the piston pressure surface(s) of the piston in a projection plane transverse to the actuating direction of the piston, in particular perpendicular to the actuating direction of the piston, delimits only a part of the pressure chamber transverse to the actuating direction of the piston.

This solution can be used to downsize the piston pressure surface(s) and thus the effective surface(s), via which a force is applied to move the piston to trigger the pressure relief valve compared to the solutions known from the state of the art. These smaller surfaces result in lower locking forces, which can then be supported more easily. In other words, controllable forces develop at the piston that can be easily transferred outside the pressure chamber of the pressure relief valve to keep the pressure relief valve in the closed position during normal crusher operation. This design also reduces the mass of the piston and thus the accelerated components of the pressure relief valve. In this way, the response behavior in the event of an overload is clearly improved.

A pressure relief valve according to the disclosure can be designed in such a way that several piston pressure surfaces are present at the piston, which then, in a projection plane transverse to the actuating direction of the piston, delimit only a part of the pressure chamber transverse to the actuating direction of the piston. For this purpose, the multiple piston pressure surfaces do not all have to be present in one plane at the piston. It is also conceivable that the piston pressure surfaces have different shapes.

According to a preferred variant of the disclosure, provision may be made for a bridging device to be provided with respect to which the piston can be moved, for the bridging device to comprise at least one pressure surface section, which delimits the pressure chamber in the closed state transversely to the actuating direction of the piston, and for a projection of the pressure surface section(s) to not or to not completely cover the piston pressure surface(s) in the direction of the actuating motion of the piston into the projection plane, in particular into the closing plane. This results in a simple design.

The bridging device can be designed in particular in the form of a protrusion, preferably in the form of a mandrel.

The piston pressure surface(s) only extend(s) across part of the cross-sectional area of the pressure chamber transverse to the piston's direction of travel. The remaining cross-sectional area of the pressure chamber can then be delimited by the pressure surface section(s) of the bridging device.

Preferably, the bridging device is arranged in a fixed position in or on the cylinder.

It is also conceivable that the bridging device can be moved relative to the piston. For instance, the bridging device may be attached in such a way that it can be moved in the direction of the piston's adjustment motion and/or transverse to the direction of the piston's adjustment motion.

Further preferably, the pressure surface section of the bridging device may be arranged centrally within the pressure space, wherein further preferably an annular space is formed between the radially outer boundary wall of the pressure chamber and the assigned outer circumference of the pressure surface section, within which the piston can be moved.

If provision is made for the surface normals on the projections of the piston pressure surface(s) and the pressure surface section(s) to point in the same direction, then the bridging device can be easily assigned to the pressure chamber of the pressure relief valve.

A crusher according to the disclosure can, for instance, be designed such that the bridging device is connected, in particular connected in a stationary or movable manner, to the cylinder(s) of the pressure relief valve by means of a connection section that the bridging device holds a head on a beam in the cylinder interior, and that the head forms or bears the at least one pressure surface section. The head and the connection section can be used to safely transfer the loads present in the pressure chamber. It is conceivable that the head and/or the connection section form(s) a guide for the piston, which is designed in particular in the shape of a sleeve. This reduces the number of parts required.

A particularly preferred variant of the disclosure is such that the piston comprises a cylindrical outer wall, by means of which it faces the inner wall of the cylinder forming the pressure chamber, and that the piston is annular and comprises a preferably cylindrical inner wall. The piston is then preferably designed as a sleeve-shaped component. Owing to this design, the piston can be designed to be relatively light-weight and yet stable. The end of the piston assigned to the pressure space can then at least partially form the piston pressure surface. In other words, the end face of the sleeve may at least partially form the piston pressure surface(s).

A particularly preferred design variant of the disclosure can be such that a support section of the piston is supported outside the pressure chamber relative to a spring, wherein the spring transfers a preload force into the piston in the direction of the closed position of the piston in order to preload the piston against a valve seat. In this way a secure positioning of the piston in the closed position at controllable spring forces is ensured. At the same time, a quick return of the piston after an overload situation has ended is implemented in a technically simple manner. The spring can be a mechanical element, for instance a coil or disk spring. It is also conceivable that the spring is formed by a fluid system, in particular a hydraulic system. It is conceivable that this hydraulic system is formed including the hydraulic cylinder, in particular the space of the hydraulic cylinder that accommodates the piston rod. It is conceivable that the spring is formed by several spring elements.

A particularly preferred variant of the disclosure is such that the piston delimits a low-pressure area of the pressure relief valve with respect to the pressure chamber, and that an actuating section is used to move the piston in the low-pressure area when it is moved from the closed position to the open position. In the closed position, the low-pressure area and thus the area of the piston's actuating section held in this position does not provide any contact surface for the fluid in the pressure chamber. The differential pressure therefore influences the closing force.

If the low-pressure area is in an air-conveying connection with the environment, the closing force can be supported, for instance by a spring or a spring system, as described above. Accordingly, this spring or the spring system has to be sufficiently strong.

However, it is also conceivable that the low-pressure area at the piston rod end of the hydraulic cylinder is relieved. In that case, a pressure regulating system may be assigned to the space of the hydraulic cylinder, which accommodates the piston rod that pre-tensions the hydraulic fluid in this area. This then supports or causes the closing force of the piston (for instance, a spring can also be used-see above). This also results in a pressure relief valve that can react individually to the individual load case. If the pressure in the pressure space of the hydraulic cylinder is increased at a relatively high load on the crusher, which does not yet represent an overload situation, wherein the hydraulic cylinder piston of the hydraulic cylinder enters the pressure space, the pressure at the rod end (this is the area of the hydraulic cylinder that receives the piston rod) decreases. The pressure regulating system then adjusts the pressure at the rod end. There, the pressure regulator has a limited capacity to maintain the pressure. The pressure regulator at the pressure relief valve therefore causes the piston of the pressure relief valve to remain in the closed position. Crushing operations can therefore continue in this load situation.

If an overload situation occurs, the pressure at the rod end drops sharply and the pressure regulator no longer maintains the pressure at the rod end. At the same time, the sharp rise in pressure at the bottom end of the hydraulic cylinder causes the pressure relief valve to open. In this way, the pressure relief valve can adapt to different load situations.

A possible variant of the disclosure can be such that the cylinder of the pressure relief valve comprises at least one outflow opening in the area of the pressure chamber, which outflow opening in the closed position of the piston is covered by a body area of the piston adjoining the piston pressure surface and in the open position of the piston is at least partially uncovered, and that the outflow opening is connected via a line section directly or indirectly to a tank and/or directly or indirectly via a return line to a chamber which accommodates a piston rod of the hydraulic cylinder.

A particularly preferred variant of the disclosure can be such that the projection of the piston pressure surface(s) of the piston transverse to the actuating direction of the piston into the closing plane preferably covers at least 5% and at most 80% and particularly preferably at least 10% and at most 50% of the projection of the piston pressure surface(s) of the piston transverse to the actuating direction of the piston in the closing plane plus the pressure surface sections of the bridging device.

In a preferred variant of the disclosure, a maximum of 50%, preferably a maximum of 25%, of the piston pressure surface(s) of the piston in the closed position is located transverse to the actuating direction of the piston in the closing plane in the area of the outflow opening.

The problem of the disclosure is also solved using a method for operating a crusher, in which provision is made for the piston of the pressure relief valve to be moved when a pressure threshold value is exceeded in the pressure space of the hydraulic cylinder, and when the pressure in the pressure chamber falls below a relief pressure, for the piston to be returned into the closed position by means of a spring.

The problem of the disclosure is also solved by a method for operating a crusher in which provision is made for, in the closed state of the pressure relief valve, the projection of the piston pressure surface(s) of the piston to delimit only a part of the pressure chamber transverse to the actuating direction of the piston in a projection plane transverse to the actuating direction of the piston, for the piston of the pressure relief valve to be moved when a pressure threshold value is exceeded in the pressure space of the hydraulic cylinder, and for the piston to be returned to the closed position by means of a spring when the pressure in the pressure chamber falls below a relief pressure.

BRIEF DESCRIPTION OF THE DRAWINGS

The disclosure is explained in greater detail below based on exemplary embodiments shown in the drawings. In the figures.

DETAILED DESCRIPTION

Figure 1:
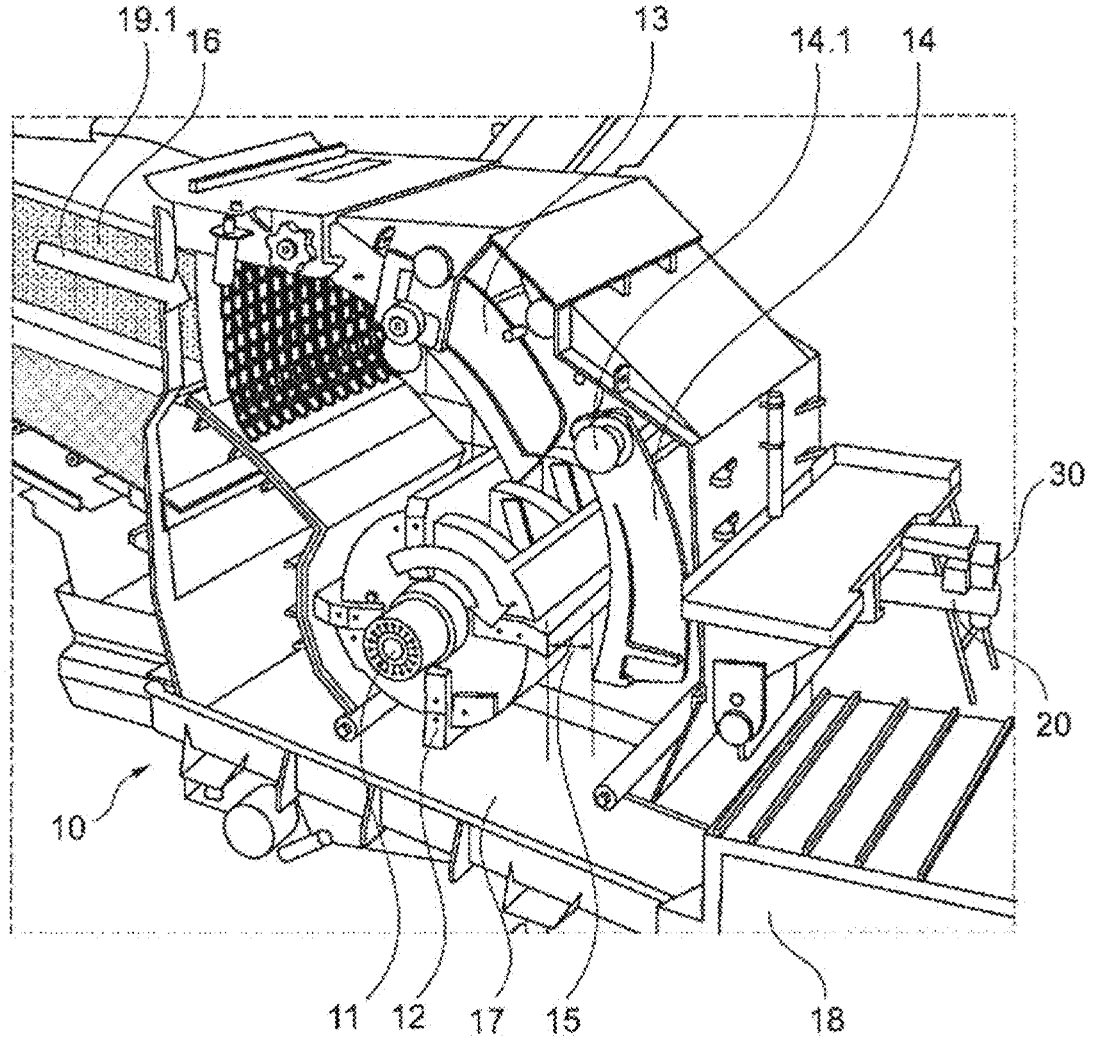
FIG. 1 shows a perspective schematic diagram of a crusher unit of a rotary impact crusher with connected machine components of the crusher.

FIG. 1 shows a crusher unit 10 of a rotary impact crusher. The crusher unit 10 comprises a crusher housing, in which a movable crusher body 11 is rotatably mounted. Accordingly, the movable crusher body 11 is designed as a rotor. The rotor bears impact bars 12 in the area of its outer circumference.

An upper impact rocker 13 is disposed inside the crusher housing. Furthermore, a further crusher body 14 is also disposed in the crusher housing, which in this case forms a lower impact rocker.

A crushing gap 15 is formed between the rotor (crusher body 11) and the lower impact rocker (crusher body 14). When the rotor rotates, the radially outer ends of the impact bars 12 form an outer crushing circle. This crushing circle, in conjunction with a facing surface of the lower impact rocker, forms the crushing gap 15. A swivel bearing 14.1 is used to swivel mount the lower impact rocker 14. The width of the crushing gap 15 can be adjusted via the selected swivel position of the lower impact rocker.

As FIG. 1 further shows, a material feed 16 can be assigned to the crusher unit 10. This material feed 16 can be used to convey material 19.1 to be crushed into the crushing chamber. The conveying direction is symbolized by an arrow in FIG. 1. When the material 19.1 to be crushed enters the area of the crusher body 11, the impact bars 12 fling it outwards. In this process, this material hits the upper impact rocker 13 and the lower impact rocker 14. The material to be broken 19.1 is crushed when an impact bar 12 or the two impact rockers 13, 14 hit(s) material to be crushed in the crushing chamber.

Figure 2:
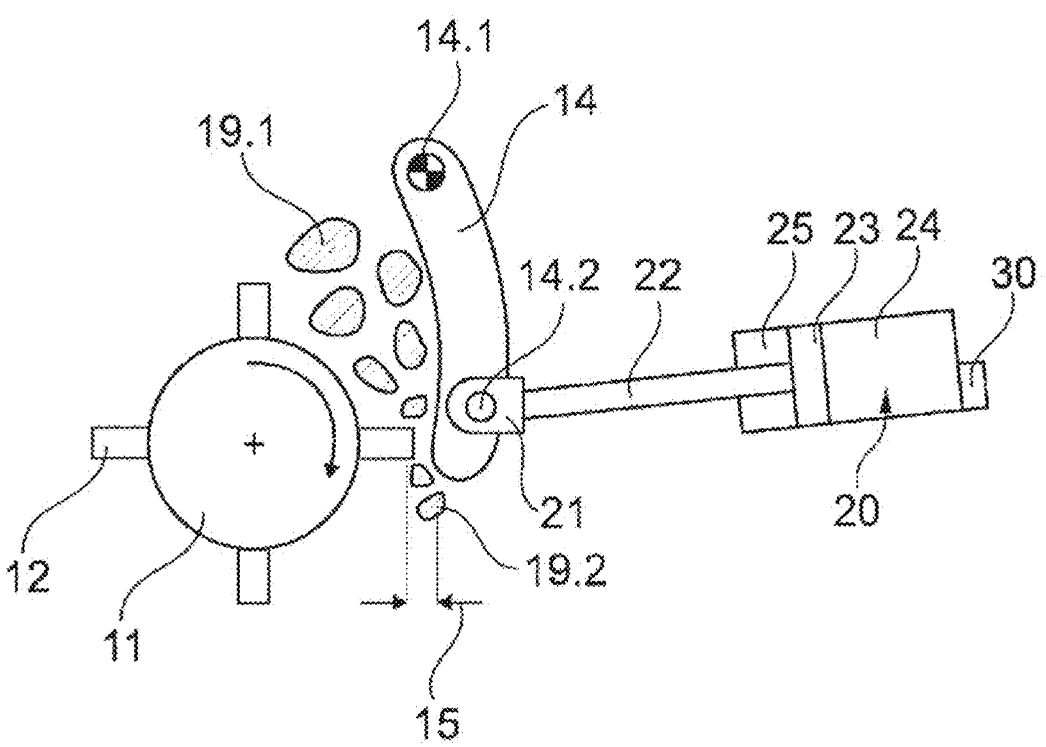
FIGS. 2 and 3 show a schematic representation of the crusher unit according to FIG. 1 having an overload triggering device.
Figure 3:
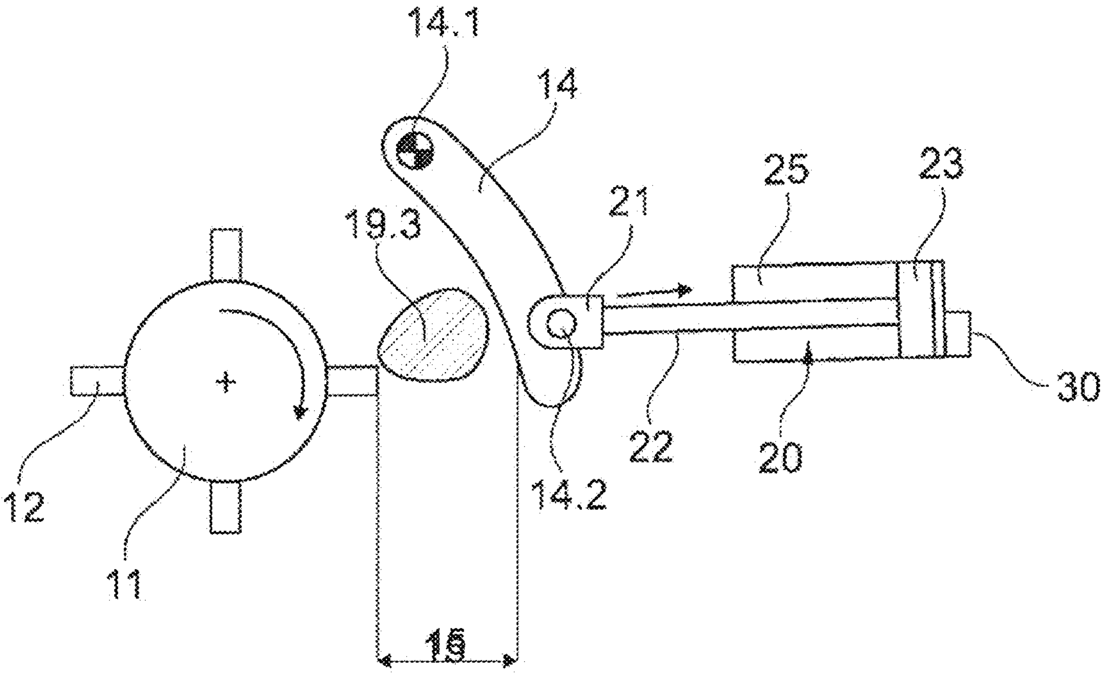

This is shown for the lower impact rocker 14 in more detail in FIGS. 2 and 3 by way of example. When the material to be crushed 19.1 hits the crusher body 14, crushed material 19.2 is produced, as shown in FIG. 2. As soon as this crushed material 19.2 has a grain size smaller than the crushing gap 15, this crushed material 19.2 falls through the crushing gap 15. Then it enters a collection area 17 below the movable crusher body 11 (rotor). As FIG. 1 shows, a conveyor 18 is connected to the collection area 17. This conveyor 18 can be used to remove the crushed material 19.2.

As FIG. 2 further shows, an actuator in the shape of a hydraulic cylinder 20 is used to support the crusher body 14 relative to the machine structure of the crusher. The support at the machine structure, for instance at the machine frame of the crusher, is not detailed in the drawings. However, FIG. 1 shows that the hydraulic cylinder 20 is installed in a protected manner mainly outside the crusher housing in which the rotor is mounted.

As shown in FIGS. 2 and 3, the hydraulic cylinder 20 has a cylinder 25, in which a piston 23 of a hydraulic cylinder is movably guided. The piston 23 of the hydraulic cylinder bears a piston rod 22. The piston rod 22 is equipped with a coupling piece 21 at its end facing away from the piston 23 of the hydraulic cylinder, which coupling piece comprises a bearing part. This bearing part is used to connect the coupling piece 21 to a bearing 14.2 of the crusher body 14. In this way, the hydraulic cylinder 20 is swivel mounted to the crusher body 14. The coupling point is at a distance from the swivel bearing 14.1.

As FIG. 2 shows, the piston 23 of the hydraulic cylinder delimits a pressure space 24 in the cylinder 25. Hydraulic fluid, in particular hydraulic oil, is filled into the pressure space 24. The piston 23 of the hydraulic cylinder is supported against this medium. In this way, the piston rod 22 and the crusher body 14 are held in the predetermined crushing position shown in FIG. 2.

Depending on the crushing task at hand, the operating position of the crushing gap 15 has to be set accordingly. The crusher has a control device for this purpose. If, starting from the position shown in FIG. 2, the crushing gap 15 is to be widened, hydraulic fluid is drained from the pressure space 24. This causes the piston 23 of the hydraulic cylinder to move further into the cylinder 25 until the desired crushing gap 15 has been set. On the other hand, if a narrower crushing gap 15 is desired, additional hydraulic fluid is added to the pressure space 24. This moves the piston 23 of the hydraulic cylinder while enlarging the pressure space 24. The piston rod 22 continues to move out of the cylinder 25. This causes the crusher body 14 to swivel clockwise, resulting in a narrowing of the crushing gap 15.

As FIGS. 2 and 3 show, an overload triggering device 30 is used. The overload triggering device can either be connected directly to the hydraulic cylinder 20 or installed separately therefrom at the machine end.

The disclosure can also be implemented on a different type of rock crusher, for instance on a jaw crusher, a cone crusher or a roll crusher.

In a jaw crusher, the crusher unit has a fixed crushing jaw 11 as the first crusher body and a crusher body 14 opposite therefrom in the form of a movable crushing jaw. The fixed and movable crushing jaws are aligned at an oblique angle to each other such that a shaft tapering conically towards a crushing gap 15 is formed between them. The movable crushing jaw is driven, for instance, by an eccentric.

The eccentric is used to move the movable crushing jaw towards and away from the stationary crushing jaw in an elliptical motion. In the course of such a stroke, the distance between the crushing jaws also changes. The motion of the movable crushing jaw causes the material 19.1 to be crushed to be broken further and further along the conical shaft until it reaches a grain size that allows it to exit the shaft through the crushing gap 15. The broken material 19.2 falls onto a crusher discharge belt, which is used to convey it along. The movable crushing jaw can be supported relative to the machine frame by means of an actuator 20, which can take the form of a hydraulic cylinder 20, for instance. The hydraulic cylinder 20 can, for instance, be designed in the manner described above. An overload triggering device 30 can then be coupled to the hydraulic cylinder 20.

Figure 4:
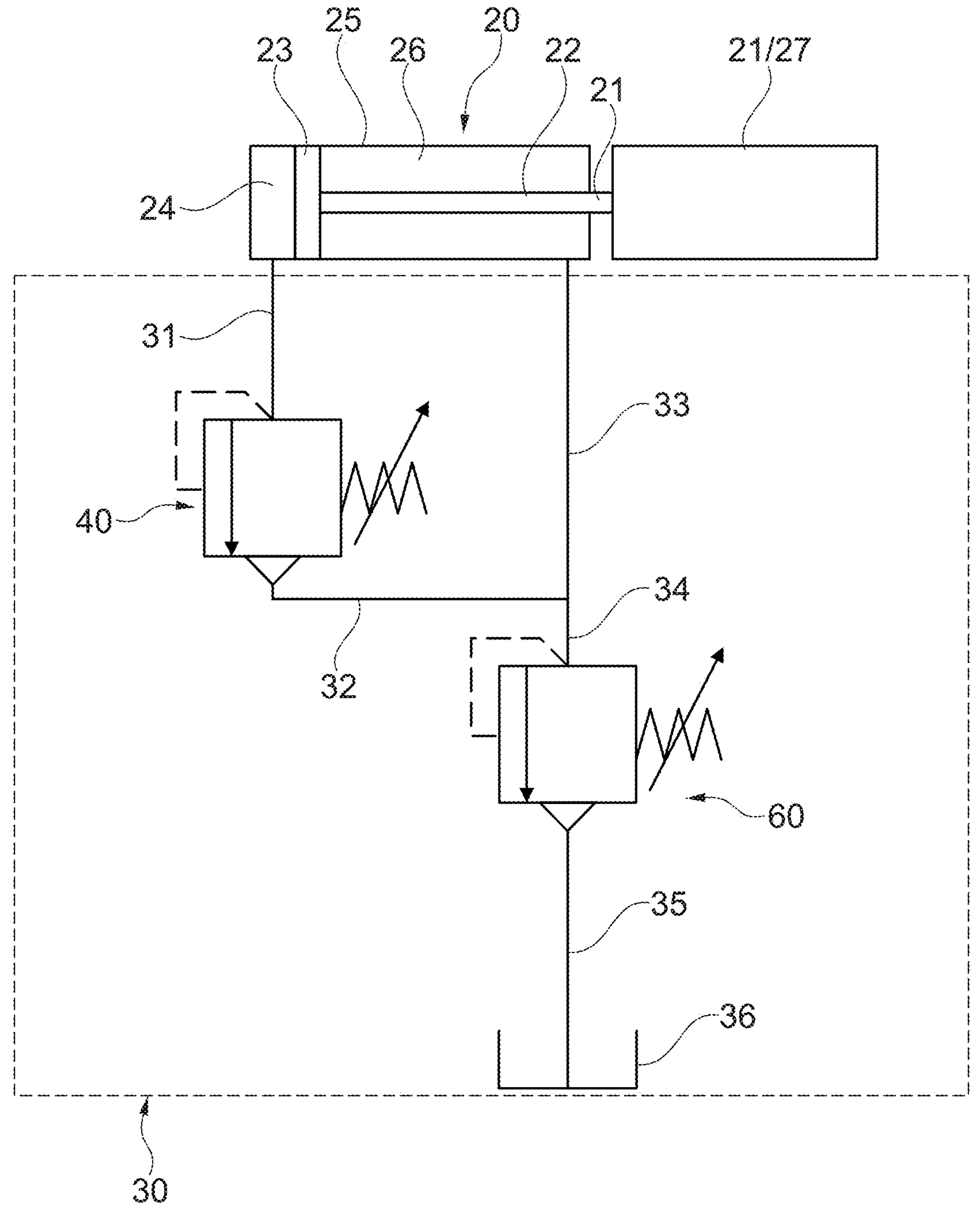
FIG. 4 shows a schematic representation of the overload triggering device.

FIG. 4 illustrates a design variant of an overload release device 30. The illustration again shows the hydraulic cylinder 20 in conjunction with the hydraulic cylinder piston 23 guided inside the cylinder 25, which piston is coupled to the piston rod 22. The piston rod 22 has been moved out of the cylinder 25. The piston rod 22 is disposed in a chamber 26 of the cylinder, which forms the rod end of the hydraulic cylinder 20. Outside the cylinder 25, a transmission device 27 is used to couple the piston rod 22 to the crusher body 14. In the simplest case, the coupling piece 21 can form transmission device 27.

The pressure space 24 of the hydraulic cylinder 20 is connected to a pressure relief valve 40 via a pressure line 31. The chamber 26 (rod end) of the hydraulic cylinder 20 is hydraulically connected to a pressure relief valve 60 via a return line 33 and a manifold 34.

Figure 5:
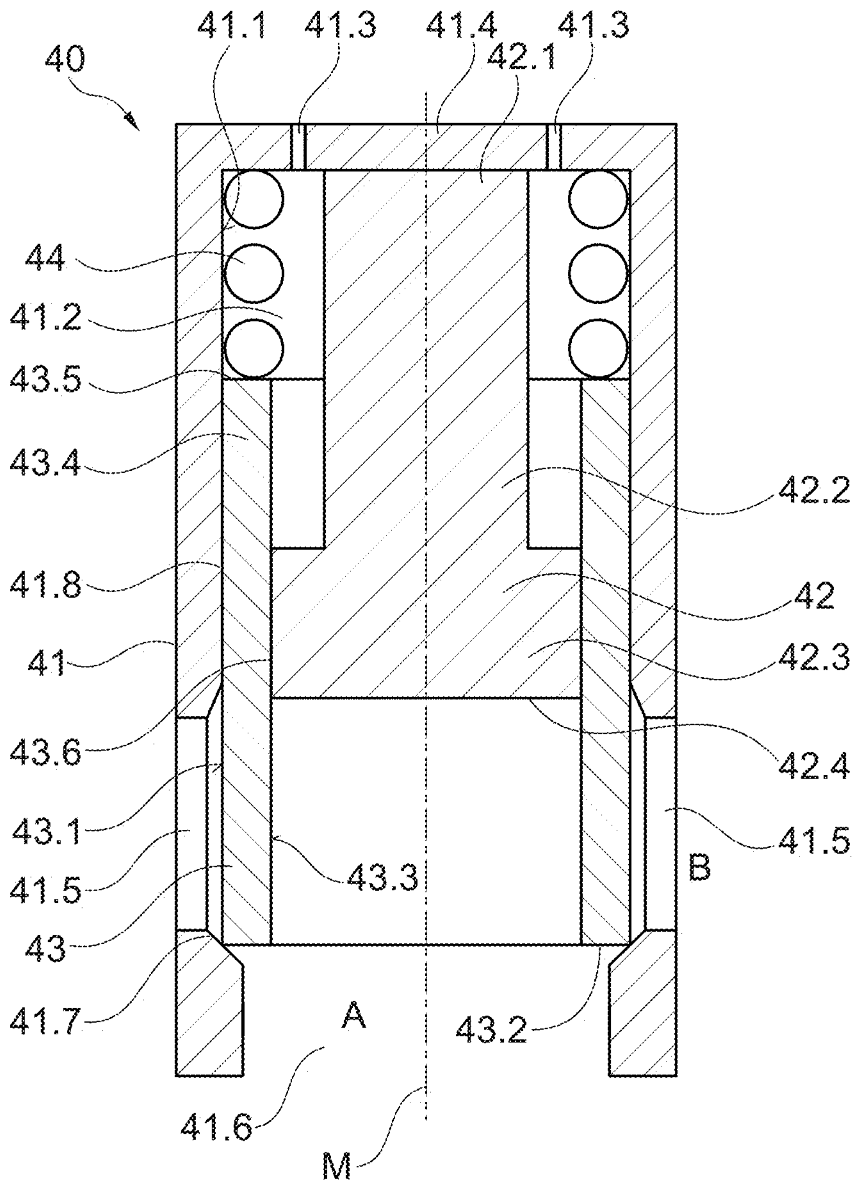
FIG. 5 shows a schematic representation of a pressure relief valve of the overload triggering device.

With reference to FIG. 5, a possible design variant of a pressure relief valve 40 is explained below. Preferably, the pressure relief valve 40 is inserted at the location of the overload release device 30, which is hydraulically connected to the pressure space 24 via the pressure line 31.

FIG. 5 illustrates that the pressure relief valve 40 comprises a cylinder 41. A piston 43 is guided in a linearly adjustable manner inside the cylinder 41. The piston 43 may be referred to as a pressure relief piston 43. The cylinder 41 may be referred to as a pressure relief cylinder 41 or as a housing 41 of the pressure relief valve 40.

The cylinder 41 has an inner cylinder wall 41.1, which is designed to be preferably hollow cylindrical. The inner cylinder wall 41.1 forms a sliding surface 41.8. The piston 43 is sealed against the sliding surface 41.8. The piston 43 may comprise a cylindrical outer wall 43.1, which faces the sliding surface 41.8, and is preferably guided on the latter.

The cylinder 41 has one or more passages 41.3, which connect a low-pressure area 41.2 of the pressure relief valve 40 to the environment, as will be explained in more detail later. The at least one passage 41.3 can be provided, preferably in a bottom of a sleeve part, which is preferably designed as a cylinder base 41.4 of the cylinder 41, as FIG. 5 shows.

As FIG. 5 further shows, the cylinder 41 has at least one outflow opening 41.5, which is preferably formed as an aperture in the cylinder wall. Preferably, the at least one outflow opening 41.5 is arranged at a distance from the cylinder base 41.4, preferably in the area of the cylinder 41 facing away from the cylinder base 41.4.

A bridging device 42, for instance in the form of a protrusion protruding into the cylinder interior, in particular in the form of a mandrel, is held inside the cylinder 41, as shown in FIG. 5. Preferably, the bridging device 42 is connected to the cylinder 41 in a stationary manner. It is also possible that the bridging device 42 is not connected to the cylinder 41 in a stationary manner. For instance, the bridging device 42 may have radial play. In this way, manufacturing tolerances can be compensated for, for instance. Additionally or alternatively, it is also conceivable that the bridging device 42 has axial play, for instance to serve as an accumulator.

According to this exemplary embodiment, the bridging device 42 may be coupled to the cylinder 41, preferably the cylinder base 41.4, by means of a connection section 42.1.

The bridging device 42 has a beam 42.2, which bears a head 42.3. The head 42.3 has a pressure surface section 42.4. In the closed state of the pressure relief valve 40, the pressure surface section 42.4 delimits a pressure chamber 41.6 within the cylinder 41.

The pressure surface section 42.4 can be designed as a plane surface, as FIG. 5 shows. In particular, the pressure surface section 42.4 can be disk-shaped, especially as a circular disk. However, it is also conceivable that the pressure surface section 42.4 is composed of several surface parts that do not necessarily have to be in one plane, but nevertheless delimit the pressure chamber 41.6. In that case, it is advantageous if the projection of all surface parts of the pressure surface section 42.4 in a plane perpendicular to the central longitudinal axis M of the cylinder 41 forms a circular disk.

FIG. 5 shows that the projected surface of the pressure surface section 42.4 in a plane transverse to the actuating direction of the piston 43 (in particular perpendicular to the central longitudinal axis M of the cylinder 41) does not completely delimit the pressure chamber 41.6 at one end. In particular, as FIG. 5 shows, there may be a residual surface, in particular an annular surface, radially adjacent to this projected surface.

The piston 43 can preferably be designed in the form of a sleeve as shown. The piston 43 is particularly preferably designed to be rotationally symmetrical. The inner surface of the piston 43 may form a guide surface 43.6, preferably cylindrical. By means of the guide surface 43.6, the piston 43 can preferably be guided on the bridging device 42 in the direction of the central longitudinal axis M in a movable and sealed manner. Preferably, the piston 43 extends through the aforementioned residual surface.

The cylindrical outer surface of the piston 43 forms an outer wall 43.1, which can be guided in a sealed manner on the inner sliding surface 41.8 of the inner cylinder wall 41.1.

The piston 43 has a neck facing the base, in particular the cylinder base 41.4, which neck forms a support section 43.4. The support section 43.4 has an actuating section 43.5, which is supported directly or indirectly on a spring 44, which can be designed as a coil spring as in this case. At the opposite end, the spring 44 can be supported, for instance relative to the cylinder 41 or the aforementioned sleeve part, preferably directly or indirectly on the base or the cylinder base 41.4.

The spring 44 is preferably accommodated at least in part in the low-pressure area 41.2. The support section 43.4 of the piston 43 can also be arranged in the low-pressure area 41.2.

FIG. 5 shows the closed position of the pressure relief valve 40. In this state, the piston 43 is in contact with a valve seat 41.7 of the cylinder 41, wherein the piston 43 closes the at least one outflow opening 41.5. The spring 44 preloads the piston 43 against the valve seat 41.7. The valve seat 41.7 is provided as a circumferential surface, preferably as an annular surface, in the area of the inner cylinder wall 41.4, as FIG. 5 shows.

As FIG. 5 illustrates, a sealing section of the piston 43 may rest against the valve seat 41.7 in the area of its end facing the pressure chamber 41.6. Preferably, the sealing section is arranged in the area of the end face end of the piston 43, as shown in FIG. 5.

The piston 43 has a piston pressure surface 43.2, which laterally delimits the pressure chamber 41.6 in some areas. The piston pressure surface 43.2 can preferably be designed in the manner of a circumferential annular surface, as in this case.

The projections of the pressure surface section 42.4 of the bridging device 42 and the piston pressure surface 43.2 of the piston 43 in a plane transverse to the actuating direction of the piston 43, in particular perpendicular to the central longitudinal axis M, in a projection plane delimit the pressure chamber 41.6 transverse to the actuating direction of the piston 43 at one end. The projected surfaces do not overlap in this regard. However, the surfaces may partially overlap. The surface normals on the projected piston pressure surface 43.2 and the pressure surface section 42.4 preferably point in the same direction, in this exemplary embodiment in the opposite direction to the piston crown 41.4.

The inner wall 43.3 of the piston 43 also partially delimits the pressure chamber 41.6 radially at the outside.

The pressure relief valve 40 and the pressure chamber 41.6 are connected to the pressure line 31, i.e., to the pressure space 24 of the hydraulic cylinder 20.

The low-pressure area 41.2 is connected to the environment via at least one passage 41.3. In that case, the ambient pressure of the air may be present in the low-pressure area 41.2 if an air-conveying connection is created via the at least one passage 41.3.

Alternatively, the low-pressure area 41.2 is connected to the chamber 26 of the hydraulic cylinder 20 via a line section 32 and the return line 33. Accordingly, the pressure at the rod end of the hydraulic cylinder 20 (pressure in chamber 26) is present at the low-pressure area 41.2.

During normal crushing operation and with the crushing gap 15 set, the pressure relief valve 40 is in the position shown in FIG. 5. The pressure of the pressure space 24 is also present at the pressure chamber 41.6. If the crushing forces now increase during normal crushing operation, for instance if harder rock material is present for breaking, then the transmission device 27 moves the piston rod 22 of the hydraulic cylinder 20 inside the cylinder 25. This also moves the hydraulic cylinder piston 23. If a critical limit pressure is not exceeded, the crushing gap 15 widens a little, for instance as a result of the compressibility of the fluid (in particular the hydraulic oil) and/or a component that can be elastically displaced in a limited manner, without the pressure relief valve 40 being triggered. In this way, the system can adapt without interrupting the crushing operation.

Preferably, the chamber 26, i.e., the rod end of the hydraulic cylinder 20, is provided with a pressure regulating system that pretensions the hydraulic fluid in this area. This supports the closing force of the piston 43 caused by the spring 44 when the low-pressure area 41.2 is hydraulically connected to the rod end. This also results in a pressure relief valve 40 that can react individually to the individual load case. If the pressure in the pressure space 24 of the hydraulic cylinder 20 is increased at a relatively high load on the crusher, which does not yet represent an overload situation, wherein the hydraulic cylinder piston 23 of the hydraulic cylinder 20 enters the pressure space 24, the pressure at the rod end decreases. The pressure regulating system then adjusts the pressure at the rod end. There, the pressure regulator has a limited capacity to maintain the pressure. The pressure regulator at the pressure relief valve 40 therefore causes the piston 43 of the pressure relief valve 40 to remain in the closed position. Crushing operations can therefore continue in this load situation.

If an overload situation occurs, the pressure at the rod end drops sharply and the pressure regulator no longer maintains the pressure at the rod end. In conjunction with the sudden increase in pressure in the pressure space 24 and thus in the pressure chamber 41.6, this pressure drop then results in a movement of the piston 43 in the direction of the central longitudinal axis M. This releases the at least one outflow opening 41.5 of the pressure relief valve 40. The fluid held in the pressure chamber 41.6 expands via the outflow opening 41.5. The at least one outflow opening 41.5 may open out into the line section 32.

If the low-pressure area 41.2 is in an air-conveying connection with the environment, the pressure relief valve opens when the opening force in the direction of the central longitudinal axis M on the piston 43 resulting from the pressure in the pressure chamber 41.6 and the effective piston pressure surface exceeds the closing force acting in the opposite direction. The closing force results from the spring force of the spring 44 plus the compressive force, which is calculated from the ambient pressure and the limiting surface of the piston 43 projected in a plane transverse to the direction of motion of the piston 43, which is used to delimit the low-pressure area 42.6.

The fluid flowing out of the pressure relief valve 40 enters the chamber 26 of the hydraulic cylinder 20. Because the chamber 26 cannot hold all of the displaced fluid, some of the fluid is discharged into a tank 36. For this purpose, the line section 32 is connected to a pressure relief valve 60 via a manifold 34. Downstream of the pressure relief valve 60, the excess fluid is routed to the tank 36 via a drain 35. The pressure relief valve 60 is designed such that it only opens if a pressure threshold value is exceeded to establish the connection to the tank 36. The design of the pressure relief valve 60 can, for instance, be identical to that of the pressure relief valve 40 to reduce the number of parts required.

After the overload event has ended, hydraulic fluid is routed into the pressure space 24 of the hydraulic cylinder 20 via a regulating system until the desired width of the crushing gap 15 is restored. The hydraulic fluid can be returned from the tank 36 to the pressure space 24 by means of a pump (not shown).

The invention claimed is:

1. A crusher for mineral materials or recycling materials, comprising:

a first crusher body:

a movable second crusher body arranged such that a crushing gap is formed between the first and second crusher bodies;

a hydraulic cylinder coupled to one of the crusher bodies and configured to permit an evasive motion of the coupled one of the crusher bodies to increase a width of the crushing gap, the hydraulic cylinder including a pressure space; and a pressure relief valve including:

a pressure chamber communicated with the pressure space of the hydraulic cylinder;

a pressure relief piston movable in an actuating direction between a closed position and an open position, wherein a fluid-conveying connection between the pressure chamber and a pressure equalization area exterior of the pressure relief valve is blocked in the closed position and is at least partially open in the open position; and the pressure relief piston including at least one piston pressure surface delimiting the pressure chamber in the closed position transversely to the actuating direction of the piston, wherein in the closed position of the pressure relief piston a projection of the at least one piston pressure surface in a projection plane transverse to the actuating direction of the pressure relief piston delimits only a part of the pressure chamber transverse to the actuating direction of the pressure relief piston.

2. The crusher of claim 1, wherein the pressure relief valve further comprises:

a bridging device relative to which the pressure relief piston is adjustable, the bridging device including at least one pressure surface section delimiting the pressure chamber transversely to the actuating direction of the pressure relief piston, wherein a projection of the at least one pressure surface section in the actuating direction of the pressure relief piston does not completely cover the at least one piston pressure surface of the pressure relief piston.

3. The crusher of claim 2, wherein:

a surface normal of the at least one piston pressure surface of the pressure relief piston and a surface normal of the at least one pressure surface section of the bridging device point in the same direction.

4. The crusher of claim 1, wherein the pressure relief valve further comprises:

a housing forming the pressure chamber and having an inner cylinder wall; and wherein the pressure relief piston is annular and includes a cylindrical outer piston wall received in the inner cylinder wall of the housing, the pressure relief piston further including a cylindrical inner piston wall.

5. The crusher of claim 1, wherein:

the pressure relief piston includes a support section extending outside of the pressure chamber; and the pressure relief valve further includes a spring engaging the support section and configured to transfer a preload force into the pressure relief piston in the closing direction in order to preload the pressure relief piston against a valve seat.

6. The crusher of claim 1, wherein the pressure relief valve further comprises:

a housing having an inner cylinder wall;

a bridging device including at least one pressure surface section delimiting the pressure chamber transversely to the actuating direction of the pressure relief piston; and wherein the bridging device is connected to the housing by a connection section and the bridging device is adjustable in position relative to the housing in the actuating direction and/or transversely to the actuating direction of the pressure relief piston.

7. The crusher of claim 1, wherein the pressure relief valve further comprises:

a housing having an inner cylinder wall;

a bridging device including at least one pressure surface section delimiting the pressure chamber transversely to the actuating direction of the pressure relief piston; and wherein the bridging device includes a beam and a head mounted on the beam within an interior of the housing, the head forming the at least one pressure surface section.

8. The crusher of claim 1, wherein:

the pressure relief piston delimits a low-pressure area of the pressure relief valve and the pressure relief piston is moved into the low-pressure area when the pressure relief piston is moved from the closed position to the open position.

9. The crusher of claim 8, wherein:

the low-pressure area is connected in an air-conveying connection to an environment surrounding the pressure relief valve by at least one passage.

10. The crusher of claim 8, wherein:

the low-pressure area is connected hydraulically to a piston rod chamber of the hydraulic cylinder.

11. The crusher of claim 1, wherein the pressure relief valve further comprises:

a housing having an inner cylinder wall and at least one outflow opening, the at least one outflow opening being covered by the pressure relief piston in the closed position, and the at least one outflow opening being at least partially uncovered in the open position; and wherein the at least one outflow opening is connected to a tank and/or to a piston rod chamber of the hydraulic cylinder.

12. The crusher of claim 1, wherein the pressure relief valve further comprises:

a bridging device including at least one pressure surface section delimiting the pressure chamber transversely to the actuating direction of the pressure relief piston; and a projection of the at least one piston pressure surface of the pressure relief piston in the actuating direction covers at least 5% and at most 80% of a total of the projection of the at least one piston pressure surface of the pressure relief piston in the actuating direction plus a projection of the at least one pressure surface section of the bridging device in the actuating direction.

13. The crusher of claim 1, wherein the pressure relief valve further comprises:

a bridging device including at least one pressure surface section delimiting the pressure chamber transversely to the actuating direction of the pressure relief piston; and a projection of the at least one piston pressure surface of the pressure relief piston in the actuating direction covers at least 10% and at most 50% of a total of the projection of the at least one piston pressure surface of the pressure relief piston in the actuating direction plus a projection of the at least one pressure surface section of the bridging device in the actuating direction.

14. The crusher of claim 1, wherein:

the at least one piston pressure surface has an area a maximum of 25% of a total surface area of the pressure relief piston exposed to the pressure chamber.

15. A method of operating the crusher of claim 1, comprising:

moving the pressure relief piston to the open position when a pressure threshold value in the pressure space of the hydraulic cylinder is exceeded; and returning the pressure relief piston to the closed position with a spring when a pressure in the pressure chamber falls below a relief pressure.

* * * * *